United States Patent
Kim

(10) Patent No.: US 10,681,273 B2
(45) Date of Patent: Jun. 9, 2020

(54) MOBILE DEVICE INCLUDING MULTIPLE CAMERAS

(71) Applicant: SAMSUNG ELECTRONICS CO., LTD., Suwon-si (KR)

(72) Inventor: Tea-Hyung Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/020,263

(22) Filed: Jun. 27, 2018

(65) Prior Publication Data
US 2019/0068881 A1 Feb. 28, 2019

(30) Foreign Application Priority Data

Aug. 24, 2017 (KR) .................. 10-2017-0107562
Oct. 19, 2017 (KR) .................. 10-2017-0135756

(51) Int. Cl.
*H04N 5/232* (2006.01)
*H04N 5/225* (2006.01)
*H04N 5/247* (2006.01)

(52) U.S. Cl.
CPC ....... *H04N 5/23241* (2013.01); *H04N 5/2258* (2013.01); *H04N 5/23245* (2013.01); *H04N 5/232411* (2018.08); *H04N 5/247* (2013.01)

(58) Field of Classification Search
None
See application file for complete search history.

(56) References Cited

U.S. PATENT DOCUMENTS

| | | | |
|---|---|---|---|
| 7,623,177 B2 | 11/2009 | Nakamura et al. | |
| 8,477,211 B2 | 7/2013 | Morihisa | |
| 9,491,367 B2 | 11/2016 | Lee et al. | |
| 9,667,850 B2 * | 5/2017 | Kim ................... | H04N 5/2258 |

(Continued)

FOREIGN PATENT DOCUMENTS

| | | | |
|---|---|---|---|
| JP | 201178080 A | 4/2011 | |
| JP | 2014106274 A | 6/2014 | |

(Continued)

*Primary Examiner* — Cynthia Segura
(74) *Attorney, Agent, or Firm* — Sughrue Mion, PLLC

(57) ABSTRACT

A mobile device is provided. The mobile device includes multiple cameras and a processor configured to perform image processing on image data output from the cameras. The mobile device supports, as a standby mode for one or more standby cameras from which an image is not provided among the multiple cameras, a sensor standby mode in which the one or more standby cameras does not perform an image sensing operation that generates the image data, a low frames per second (FPS) post standby mode in which the one or more standby cameras performs the image sensing operation that generates the image data with a low frame rate lower than a normal frame rate and the processor does not perform the image processing on the image data output from the one or more standby cameras, and a normal FPS post standby mode in which the one or more standby cameras performs the image sensing operation that generates the image data with the normal frame rate and the processor does not perform the image processing on the image data output from the one or more standby cameras.

20 Claims, 8 Drawing Sheets

| ZOOM MAGNIFICATION | WIDE ANGLE CAMERA | TELEPHOTO CAMERA |
|---|---|---|
| x1.0 ≤ ZM < x1.5 | ACTIVE MODE | SENSOR STANDBY MODE |
| x1.5 ≤ ZM < x2.0 | ACTIVE MODE | LOW FPS STANDBY MODE |
| x2.0 ≤ ZM < x2.5 | ACTIVE MODE | NORMAL FPS STANDBY MODE |
| x2.5 ≤ ZM < x4.5 | ACTIVE MODE | ACTIVE MODE |
| x4.5 ≤ ZM < x5.0 | NORMAL FPS STANDBY MODE | ACTIVE MODE |
| x5.0 ≤ ZM < x5.5 | LOW FPS STANDBY MODE | ACTIVE MODE |
| x5.5 ≤ ZM | SENSOR STANDBY MODE | ACTIVE MODE |

RZM1
RZM2

(56) References Cited

U.S. PATENT DOCUMENTS

| | | | |
|---|---|---|---|
| 2004/0146313 A1* | 7/2004 | Uchizono | G03G 15/5004 |
| | | | 399/75 |
| 2007/0024737 A1* | 2/2007 | Nakamura | H04N 5/23293 |
| | | | 348/335 |
| 2008/0030592 A1* | 2/2008 | Border | H04N 5/232 |
| | | | 348/218.1 |
| 2008/0218611 A1* | 9/2008 | Parulski | H04N 5/2258 |
| | | | 348/262 |
| 2012/0026366 A1* | 2/2012 | Golan | H04N 5/232 |
| | | | 348/240.2 |
| 2014/0253693 A1* | 9/2014 | Shikata | H04N 1/2112 |
| | | | 348/47 |
| 2016/0227100 A1 | 8/2016 | Liu et al. | |
| 2017/0214866 A1* | 7/2017 | Zhu | H04N 5/2258 |
| 2018/0013955 A1* | 1/2018 | Kim | G06K 9/00335 |
| 2018/0070009 A1* | 3/2018 | Baek | H04N 5/2351 |
| 2018/0152623 A1* | 5/2018 | Li | H04N 5/2258 |
| 2018/0152639 A1* | 5/2018 | Li | H04N 5/2258 |
| 2018/0184010 A1* | 6/2018 | Cohen | H04N 5/2258 |
| 2019/0080575 A1* | 3/2019 | Lee | H04N 5/232411 |
| 2019/0082115 A1* | 3/2019 | Takahashi | H04N 5/232411 |
| 2019/0191085 A1* | 6/2019 | Chang | H04N 5/23245 |
| 2019/0199926 A1* | 6/2019 | An | G06T 7/80 |
| 2019/0379812 A1* | 12/2019 | Suman | H04N 5/2353 |

FOREIGN PATENT DOCUMENTS

| | | |
|---|---|---|
| JP | 2016134886 A | 7/2016 |
| KR | 100879648 B1 | 1/2009 |

\* cited by examiner

FIG. 6

| ZOOM MAGNIFICATION | WIDE ANGLE CAMERA | TELEPHOTO CAMERA |
|---|---|---|
| x1.0 ≤ ZM < x2.5 | ACTIVE MODE | STANDBY MODE |
| x2.5 ≤ ZM < x4.5 | ACTIVE MODE | ACTIVE MODE |
| x4.5 ≤ ZM | STANDBY MODE | ACTIVE MODE |

RZM1
RZM2

FIG. 7

| ZOOM MAGNIFICATION | WIDE ANGLE CAMERA | TELEPHOTO CAMERA |
|---|---|---|
| x1.0 ≤ ZM < x1.5 | ACTIVE MODE | SENSOR STANDBY MODE |
| x1.5 ≤ ZM < x2.0 | ACTIVE MODE | LOW FPS STANDBY MODE |
| x2.0 ≤ ZM < x2.5 | ACTIVE MODE | NORMAL FPS STANDBY MODE |
| x2.5 ≤ ZM < x4.5 | ACTIVE MODE | ACTIVE MODE |
| x4.5 ≤ ZM < x5.0 | NORMAL FPS STANDBY MODE | ACTIVE MODE |
| x5.0 ≤ ZM < x5.5 | LOW FPS STANDBY MODE | ACTIVE MODE |
| x5.5 ≤ ZM | SENSOR STANDBY MODE | ACTIVE MODE |

RZM1
RZM2

MOBILE DEVICE INCLUDING MULTIPLE CAMERAS

CROSS-REFERENCE TO RELATED APPLICATIONS

This U.S. non-provisional application claims priority under 35 U.S.C. § 119 from Korean Patent Application No. 10-2017-0107562 filed on Aug. 24, 2017 in the Korean Intellectual Property Office (KIPO) and to Korean Patent Application No. 10-2017-0135756 filed on Oct. 19, 2017 in the KIPO, the entire contents of which are incorporated by reference herein in their entirety.

BACKGROUND

1. Technical Field

Example embodiments of the present inventive concept relate to electronic devices, and more particularly to mobile devices including multiple cameras.

2. Description of the Related Art

Recently, multiple cameras, such as dual cameras, are employed to provide various functions in a mobile device, such as a smartphone, a tablet computer, a digital camera, etc. However, the mobile device employing the multiple cameras may have a problem of increasing power consumption compared with a mobile device employing a single camera.

SUMMARY

It is an aspect to provide a mobile device supporting a standby mode capable of reducing power consumption for multiple cameras.

According to an aspect of one or more example embodiments, there is provided a mobile device comprising a plurality of cameras; and a processor configured to perform image processing on image data output from the plurality of cameras, wherein the mobile device supports, as a standby mode for at least one standby camera from which an image is not provided among the plurality of cameras, a sensor standby mode in which the at least one standby camera does not perform an image sensing operation that generates the image data, a low frames per second (FPS) post standby mode in which the at least one standby camera performs the image sensing operation that generates the image data with a low frame rate lower than a normal frame rate and the processor does not perform the image processing on the image data output from the at least one standby camera, and a normal FPS post standby mode in which the at least one standby camera performs the image sensing operation that generates the image data with the normal frame rate and the processor does not perform the image processing on the image data output from the at least one standby camera.

According to another aspect of one or more example embodiments, there is provided a mobile device comprising a plurality of cameras including a first camera and a second camera; and a processor configured to perform image processing, wherein, when a first image from the first camera is to be provided, and a second image from the second camera is not to be provided, the first camera operates in an active mode in which the first camera performs an image sensing operation that generates first image data and the processor performs the image processing on the first image data, and the second camera operates in one standby mode of a sensor standby mode in which the second camera does not perform the image sensing operation that generates second image data, a low frames per second (FPS) post standby mode in which the second camera performs the image sensing operation that generates the second image data that has a low frame rate lower than a normal frame rate and the processor does not perform the image processing on the second image data, and a normal FPS post standby mode in which the second camera performs the image sensing operation that generates the second image data having the normal frame rate and the processor does not perform the image processing on the second image data.

According to another aspect of one or more example embodiments, there is provided a mobile device comprising a plurality of cameras including a wide angle camera and a telephoto camera; and a processor configured to perform image processing on image data output from the plurality of cameras, wherein, when the mobile device captures an image with a zoom magnification less than a first reference magnification, the wide angle camera operates in an active mode, and the telephoto camera operates in a standby mode, wherein, when the mobile device captures the image with the zoom magnification greater than or equal to the first reference magnification and less than a second reference magnification, both of the wide angle camera and the telephoto camera operate in the active mode, wherein, when the mobile device captures the image with the zoom magnification greater than or equal to the second reference magnification, the wide angle camera operates in the standby mode, and the telephoto camera operates in the active mode, and wherein the standby mode for at least one standby camera of the plurality of cameras includes a sensor standby mode in which the at least one standby camera does not perform an image sensing operation that generates the image data, a low frames per second (FPS) post standby mode in which the at least one standby camera performs the image sensing operation that generates the image data with a low frame rate lower than a normal frame rate and the processor does not perform the image processing on the image data output from the at least one standby camera, and a normal FPS post standby mode in which the at least one standby camera performs the image sensing operation that generates the image data with the normal frame rate and the processor does not perform the image processing on the image data output from the at least one standby camera.

BRIEF DESCRIPTION OF THE DRAWINGS

Illustrative, non-limiting example embodiments will be more clearly understood from the following detailed description taken in conjunction with the accompanying drawings, in which:

FIG. 6 is a table for describing an example of operating modes of a wide angle camera and a telephoto camera in a mobile device including the wide angle camera and the telephoto camera according to example embodiments;

FIG. 7 is a table for describing another example of operating modes of a wide angle camera and a telephoto camera in a mobile device including the wide angle camera and the telephoto camera according to example embodiments.

DETAILED DESCRIPTION

A mobile device according to various example embodiments described herein may support, as a standby mode for at least one camera from which an image is not to be provided, a sensor standby mode, a low frames per second (FPS) post standby mode and a normal FPS post standby mode. Accordingly, power consumption for the at least one camera in the standby mode may be reduced, and/or a mode transition time from the standby mode to an active mode may be reduced.

Figure 1:
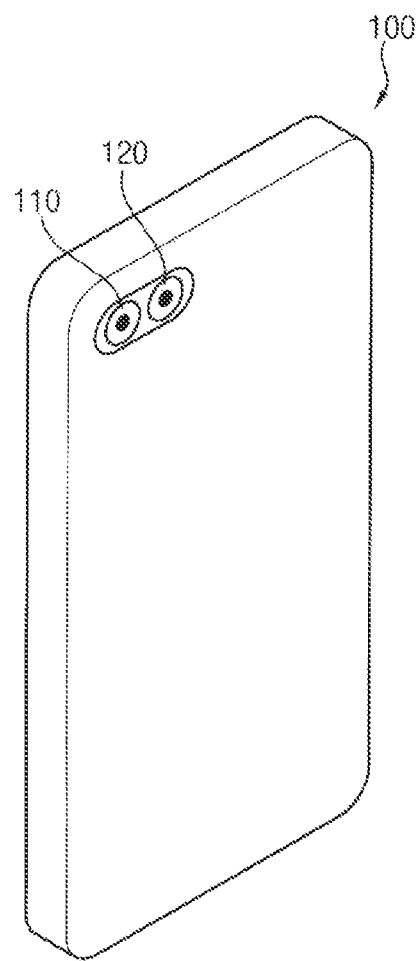
FIG. 1 is a diagram illustrating an example of a mobile device including multiple cameras according to example embodiments.
Figure 2:
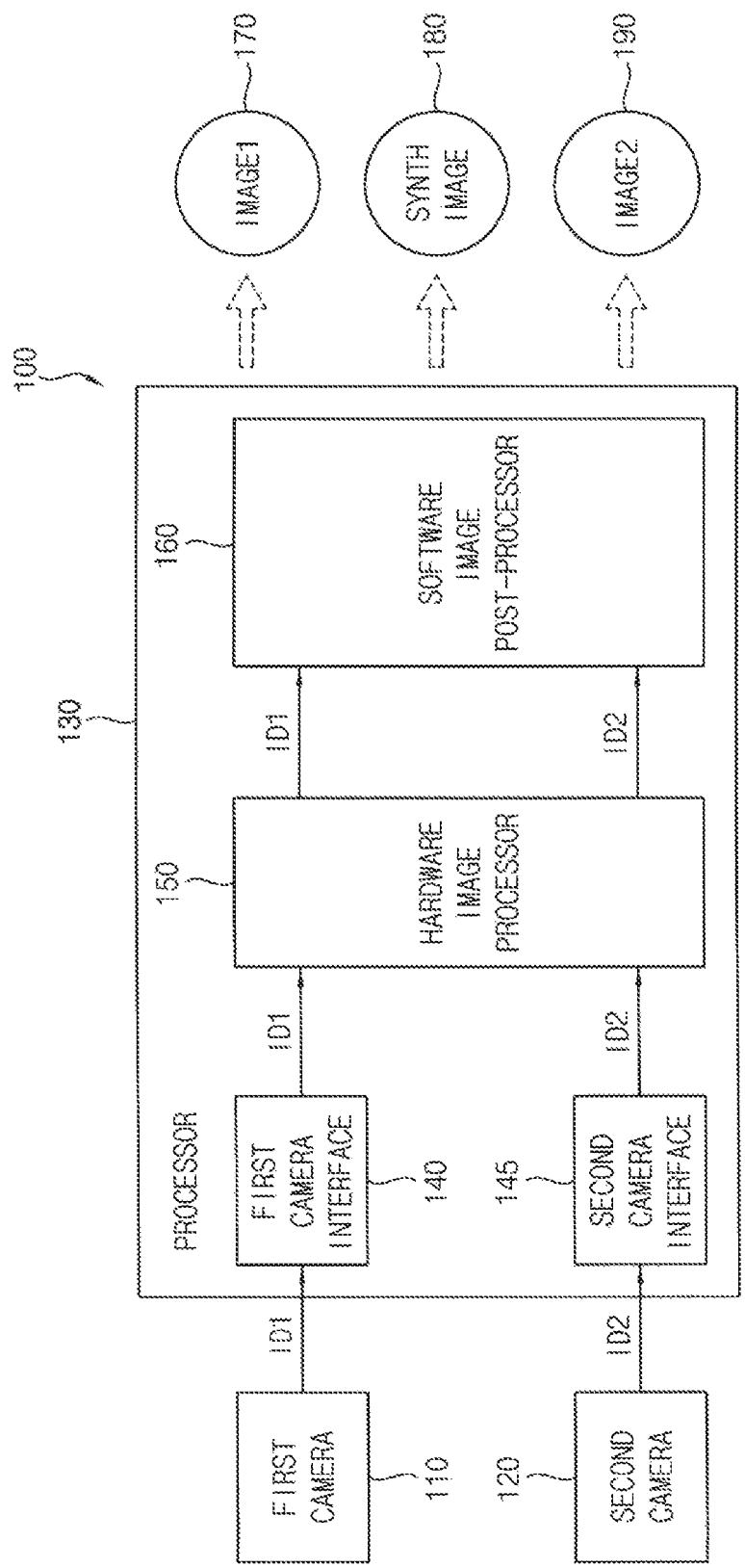
FIG. 2 is a block diagram illustrating a mobile device including multiple cameras according to example embodiments.

FIG. 1 is a diagram illustrating an example of a mobile device including multiple cameras according to example embodiments, and FIG. 2 is a block diagram illustrating a mobile device including multiple cameras according to example embodiments.

Referring to FIGS. 1 and 2, a mobile device 100 includes multiple cameras 110 and 120, and a processor 130 that performs image processing on image data ID1 and ID2 output from the multiple cameras 110 and 120, respectively. In some example embodiments, the mobile device 100 may be a smart phone as illustrated in FIG. 1. In other example embodiments, the mobile device 100 may be any mobile device, such as a tablet computer, a laptop computer, a cellular phone, an MP3 player, personal digital assistants (PDA), a portable multimedia player (PMP), a digital camera, a portable game console, etc. The example embodiments may be employed in any device which includes multiple cameras and in which it is advantageous to reduce power and/or reduce a mode transition time from a standby mode to an active mode.

The mobile device 100 may include, as the multiple cameras 110 and 120, a first camera 110 and a second camera 120. Each of the first camera 110 and the second camera 120 may include a camera lens and an image sensor. The first camera 100 may perform an image sensing operation that generates first image data ID1, and the second camera 100 may perform the image sensing operation that generates second image data ID2.

In some example embodiments, the first camera 110 may be a wide angle camera for capturing a wide angle image, and the second camera 120 may be a telephoto camera for capturing a telephoto image. In this case, the first camera 110 may include a wide angle lens and the image sensor, and the second camera 120 may include a telephoto lens and the image sensor. The first camera 110 that is the wide angle camera may be suitable for capturing an image of a close object, and the second camera 120 that is the telephoto camera may be suitable for capturing an image of a distant object.

In other example embodiments, the first camera 110 may be an RGB camera for capturing a color image, and the second camera 120 may be a mono camera for capturing a black-and-white image. In this case, the image sensor of the first camera 110 may include a color filter, and the image sensor of the second camera 120 may omit the color filter. Accordingly, the second camera 120 that is the mono camera may have an improved light reception efficiency compared with the first camera 110 that is the RGB camera.

However, the multiple cameras 110 and 120 are not limited to the example of the wide angle and telephoto cameras or to the example of the RGB and mono cameras, and may include various types of cameras according to example embodiments.

The processor 130 may control an overall operation of the mobile device 100. In some example embodiments, the processor 130 may be an application processor (AP), a mobile system-on-chip (SOC), a central processor (CPU), a microprocessor, etc. To perform the image processing on the first and second image data ID1 and ID2 output from the first and second cameras 110 and 120, respectively, the processor 130 may include a first camera interface 140 and a second camera interface 145, respectively, a hardware image processor 150, and a software post-processor 160.

The first camera interface 140 may communicate with the first camera 110, and may receive the first image data ID1 from the first camera 110. The second camera interface 145 may communicate with the second camera 120, and may receive the second image data ID2 from the second camera 120. The hardware image processor 150 may perform the image processing on the first and second image data ID1 and ID2 received through the first and second camera interfaces 140 and 145, respectively. For example, the image processing may include auto focus processing, auto exposure processing, white balance processing, conversion of Bayer image data into YUV image data, or the like. In some example embodiments, the hardware image processor 150 may be an image signal processor (ISP). The software post-processor 160 may perform image post-processing on the first and second image data ID1 and ID2 on which the image processing is performed. For example, the image post-processing may include, but is not limited to, image synthesis, image quality improvement processing, or the like. In some example embodiments, the software post-processor 160 may be implemented with software code stored in a file form, and may be operated by executing the software code stored in the file form.

In the mobile device 100 according to example embodiments, according to a capture condition, such as a zoom magnification, a capture mode, an illumination, etc., an application setting, or a user selection, only a first image (IMAGE1) 170 from the first camera 110 may be provided, only a second image (IMAGE2) 190 from the second camera 120 may be provided, or a synthesized image (SYNTH IMAGE) 180 may be provided. The synthesized image (SYNTH IMAGE) 180 may be an image where the first image 170 from the first camera 110 and the second image 190 from the second camera 120 are synthesized.

In some example embodiments, in a case where the first camera 110 is the wide angle camera suitable for capturing the image of the close object, and the second camera 120 is the telephoto camera suitable for capturing the image of the distant object, whether the first image 170 from the first camera 110 and/or the second image 190 from the second camera 120 are to be provided or not may be determined according to the zoom magnification. For example, only the wide angle image from the wide angle camera may be provided when the zoom magnification is low magnification, a synthesized image where the wide angle image from the wide angle camera and the telephoto image from the telephoto camera are synthesized may be provided when the zoom magnification is middle magnification, and only the telephoto image from the telephoto camera are synthesized may be provided when the zoom magnification is high magnification.

In other example embodiments, in a case where the first camera 110 may be the RGB camera that obtains color information and luminance information, and the second camera 120 may be the mono camera that obtains only the luminance information but has improved light reception efficiency, whether the first image 170 from the first camera 110 and/or the second image 190 from the second camera 120 are to be provided or not may be determined according to the illumination. For example, only an image from the RGB camera may be provided in a normal environment, but a synthesized image where the image from the RGB camera and an image from the mono camera are synthesized may be provided in a low illumination environment.

However, whether the first image 170 from the first camera 110 and/or the second image 190 from the second camera 120 are to be provided or not may depend on not only the zoom magnification and the illumination, but also the capture condition, the application setting, the user selection, or the like, as described above.

In the mobile device 100, when only the first image 170 from the first camera 110 is to be provided, the first camera 110 may operate in an active mode, and the second camera 120 may operate in a standby mode. The mobile device 100 according to example embodiments may support, as the standby mode for the second camera 120 from which the image 190 is not to be provided, a sensor standby mode, a low frames per second (FPS) post standby mode and a normal FPS post standby mode.

In sensor standby mode, the second camera 120 may not perform an image sensing operation that generates the image data ID2, thereby reducing power consumption.

In the normal FPS post standby mode, the second camera 120 may perform the image sensing operation that generates the image data ID2, but the processor 130 may not perform the image processing on the image data ID2 output from the second camera 120. Accordingly, the power consumption may be reduced since the processor 130 does not perform the image processing, and a mode transition time from the standby mode to the active mode may be reduced since the second camera 120 performs the image sensing operation.

Further, in the low FPS post standby mode, the second camera 120 may perform the image sensing operation that generates the image data ID2 in a low frame rate lower than a normal frame rate in the active mode (or at a normal operation) or in the normal FPS post standby mode, and the processor 130 may not perform the image processing on the image data ID2 output from the second camera 120. Accordingly, the mode transition time may be reduced since the second camera 120 performs the image sensing operation, and the power consumption may be further reduced since the processor 130 does not perform the image processing and the second camera 120 performs the image sensing operation with the low frame rate lower than the normal frame rate.

As described above, the mobile device 100 according to example embodiments may support the standby mode for at least one camera from which the image is not to be provided, thereby reducing the power consumption and/or the mode transition time. In particular, the mobile device 100, as the standby mode, the sensor standby mode, the low FPS post standby mode and the normal FPS post standby mode, and thus may reduce the power consumption and/or the mode transition time in manners suitable for respective applications.

Hereinafter, operations of the mobile device 100 when the first camera 110 operates in the active mode and the second camera 120 operates in one of the sensor standby mode, the low FPS post standby mode and the normal FPS post standby mode will be described below with reference to FIGS. 3 through 5.

Figure 3:
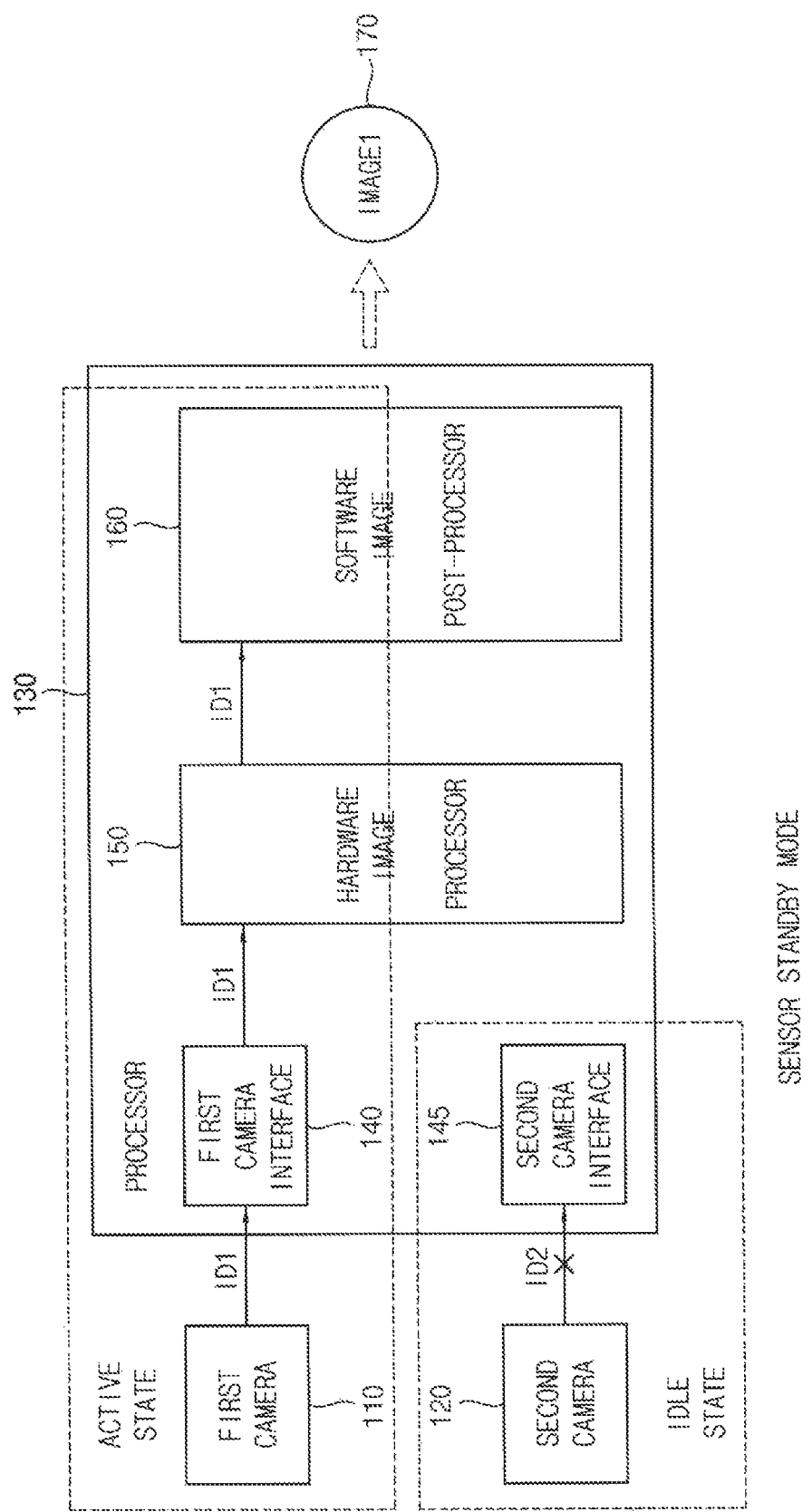
FIG. 3 is a block diagram for describing an operation of a mobile device when a second camera operates in a sensor standby mode.

FIG. 3 is a block diagram for describing an operation of a mobile device when a second camera operates in a sensor standby mode.

Referring to FIG. 3, when only the first image 170 from the first camera 110 is to be provided, the first camera 110 may operate in the active mode, and the second camera 120 may operate in the sensor standby mode.

The first image 110 operating in the active mode may perform the image sensing operation that generates the first image data ID1, and the processor 130 may perform the image processing, or the image processing using the hardware image processor 150 and the image post-processing using the software post-processor 160, on the first image data ID1. In this case, the first camera 110, the first camera interface 140, at least a portion of the hardware image processor 150 and at least a portion of the software post-processor 160 may be in an active state. In some example embodiments, the hardware image processor 150 may include a plurality of dedicated hardware image processors respectively corresponding to the plurality of cameras 110 and 120, for example, a first dedicated hardware image processor corresponding to the first camera 110 and a second dedicated hardware image processor corresponding to the second camera 120, and the first dedicated hardware image processor may be in the active state in an example illustrated in FIG. 3.

The second camera 120 operating in the sensor standby mode may not perform the image sensing operation that generates the second image data ID2. In this case, the second camera 120 and the second camera interface 145 may be in an idle state. Further, in some example embodiments, the hardware image processor 150 may include the first and second dedicated hardware image processors respectively corresponding to the first and second cameras 110 and 120, and the second dedicated hardware image processor may be in the idle state in the example illustrated in FIG. 3.

In some example embodiments, in the sensor standby mode, the second camera 120 may not be supplied with power. Accordingly, power consumption for the second camera 120 may be reduced.

In other example embodiments, each of the first and second cameras 110 and 120 may include a volatile memory that stores configuration information including information about FPS, information about a size of a pixel array to be activated, or the like. In the sensor standby mode, the volatile memory included in the second camera 120 may be supplied with power, and components other than the volatile memory included in the second camera 120 may not be supplied with power. In this case, since the configuration information is retained in the sensor standby mode, and the configuration information need not be transferred or written when the operating mode of the second camera 120 is changed from the sensor standby mode to the active mode, the mode transition time from the sensor standby mode to the active mode may be reduced. Further, since the components other than the volatile memory included in the second camera 120 are not supplied with power, the power consumption may be reduced.

In still other example embodiments, in the sensor standby mode, the second camera 120 may be supplied with power, but the second camera 120 may not perform the image sensing operation. In this case, since the second camera 120 is continuously supplied with power in the sensor standby mode, the mode transition time from the sensor standby mode to the active mode may be reduced. Further, since the image sensing operation is not performed, the power consumption may be reduced.

As described above, in the sensor standby mode, the second camera 120 may perform the image sensing operation, thereby reducing the power consumption.

Figure 4:
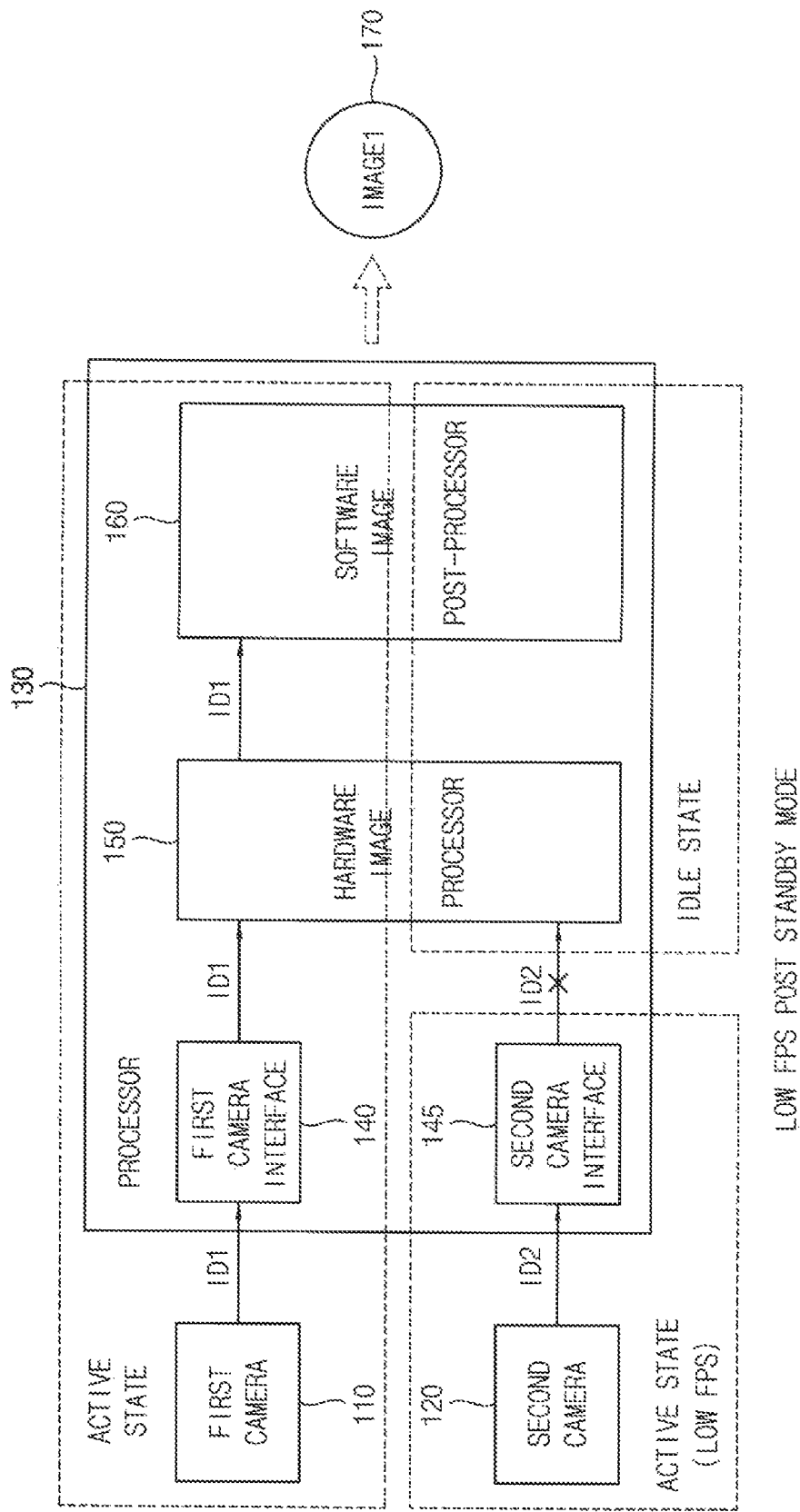
FIG. 4 is a block diagram for describing an operation of a mobile device when a second camera operates in a low frames per second (FPS) post standby mode.

FIG. 4 is a block diagram for describing an operation of a mobile device when a second camera operates in a low frames per second (FPS) post standby mode.

Referring to FIG. 4, the second camera 120 may operate in the low FPS post standby mode. The second camera 120 operating in the low FPS post standby mode may perform the image sensing operation that generates the image data ID2 with the low frame rate lower than the normal frame rate in the active mode (or at the normal operation). For example, the normal frame rate in the active mode may be, but is not limited to, about 30 fps, and the low frame rate in the low FPS post standby mode may be, but is not limited to, from about 5 fps to about 15 fps. Further, the second camera interface 145 included in the processor 130 may receive the image data ID2 with the low frame rate, but the hardware image processor 150 and the software post-processor 160 included in the processor 130 may not perform the image processing and the image post-processing. In this case, the second camera 120 and the second camera interface 145 may be in an active state with the low frame rate, and at least a portion of the hardware image processor 150 and at least a portion of the software post-processor 160 may be in an idle state.

As described above, in the low FPS post standby mode, the second camera 120 may perform the image sensing operation, thereby reducing the mode transition time from the low FPS post standby mode to the active mode. Further, in the low FPS post standby mode, the image processing by the hardware image processor 150 and the software post-processor 160 may not be performed, and the second camera 120 and the second camera interface 145 may operate with the low frame rate, thereby reducing the power consumption.

Figure 5:
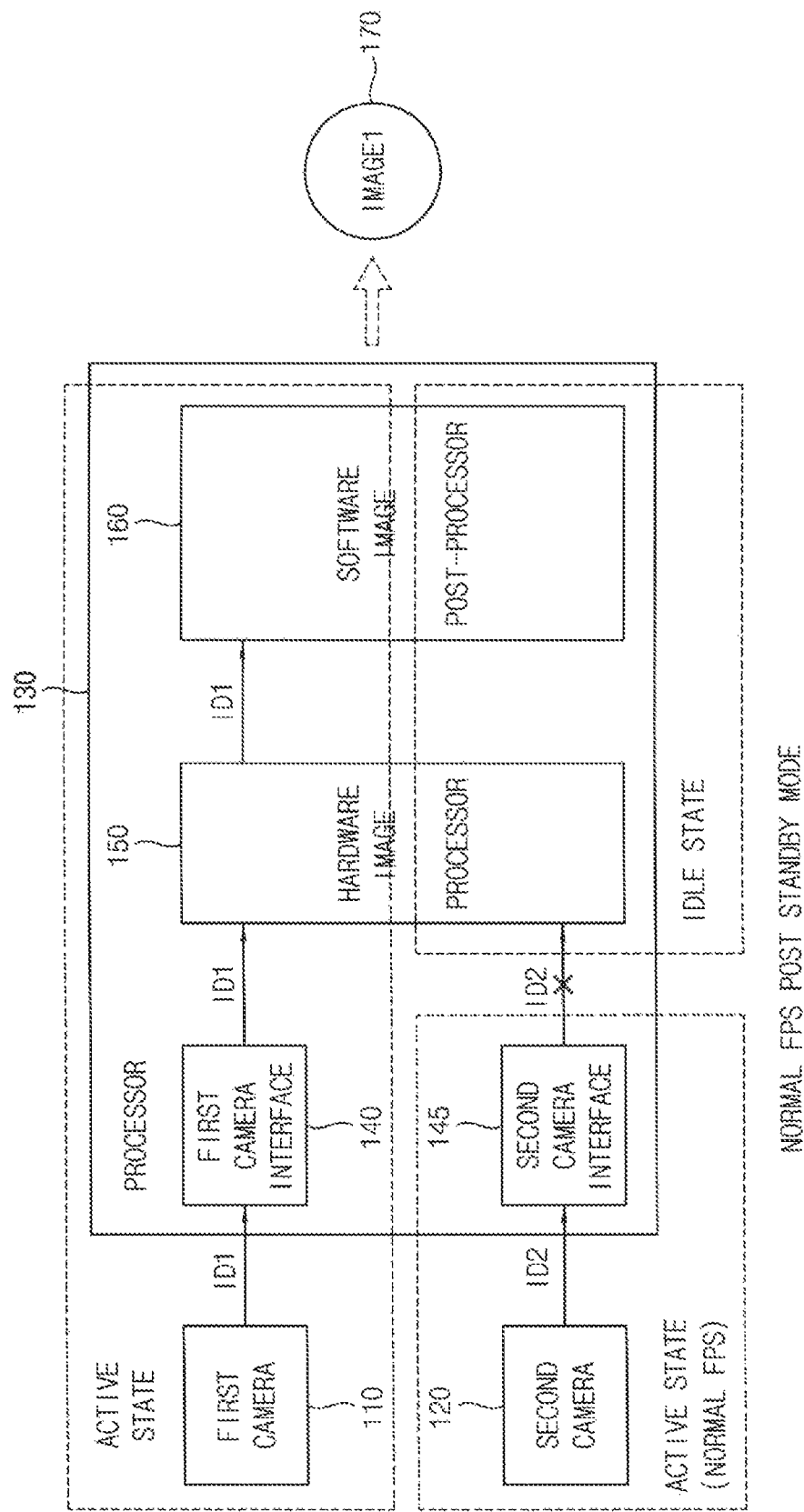
FIG. 5 is a block diagram for describing an operation of a mobile device when a second camera operates in a normal FPS post standby mode.

FIG. 5 is a block diagram for describing an operation of a mobile device when a second camera operates in a normal FPS post standby mode.

Referring to FIG. 5, the second camera 120 may operate in the normal FPS post standby mode. The second camera 120 operating in the normal FPS post standby mode may perform the image sensing operation that generates the image data ID2 with the normal frame rate in the active mode (or at the normal operation). Further, the second camera interface 145 included in the processor 130 may receive the image data ID2 with the normal frame rate, but the hardware image processor 150 and the software post-processor 160 included in the processor 130 may not perform the image processing and the image post-processing. In this case, the second camera 120 and the second camera interface 145 may be in an active state with the normal frame rate, and at least a portion of the hardware image processor 150 and at least a portion of the software post-processor 160 may be in an idle state.

As described above, in the normal FPS post standby mode, the second camera 120 may perform the image sensing operation, thereby reducing the mode transition time from the low FPS post standby mode to the active mode. Further, in the normal FPS post standby mode, the image processing by the hardware image processor 150 and the software post-processor 160 may not be performed, thereby reducing the power consumption.

Among the sensor standby mode in FIG. 3, the low FPS post standby mode in FIG. 4 and the normal FPS post standby mode in FIG. 5, the reduction in power consumption may be greatest in the sensor standby mode, and may be least in the normal FPS post standby mode. Further, among the sensor standby mode in FIG. 3, the low FPS post standby mode in FIG. 4 and the normal FPS post standby mode in FIG. 5, the reduction in the mode transition time and reliability may be greatest in the normal FPS post standby mode, and may be least in the sensor standby mode. The mobile device 100 according to example embodiments may support, as the standby mode, the sensor standby mode, the low FPS post standby mode and the normal FPS post standby mode, thereby reducing the power consumption and/or the mode transition time in manners suitable for respective applications.

FIG. 6 is a table for describing an example of operating modes of a wide angle camera and a telephoto camera in a mobile device including the wide angle camera and the telephoto camera according to example embodiments.

Referring to FIGS. 1 and 6, in some example embodiments where the first camera 110 is a wide angle camera 110 and the second camera 120 is a telephoto camera 120, whether a wide angle image 170 from the wide angle camera 110, a telephoto image 190 from the telephoto camera 120, or a synthesized image 180 where the wide angle image 170 and the telephoto image 190 are synthesized is to be provided may be determined according to a zoom magnification ZM of the mobile device 100.

For example, when the mobile device 100 captures an image with a zoom magnification ZM greater than or equal to a minimum magnification (e.g., ×1.0) and less than a first reference magnification RZM1 (e.g., ×2.5), the wide angle camera 110 may operate in the active mode to provide the wide angle image 170, and the telephoto camera 120 may operate in one of the sensor standby mode, the low FPS post standby mode and the normal FPS post standby mode.

When the mobile device 100 captures an image with the zoom magnification ZM greater than or equal to the first reference magnification RZM1 and less than a second reference magnification RZM2 (e.g., ×4.5), both of the wide angle camera 110 and the telephoto camera 120 may operate in the active mode to provide the synthesized image 180 where the wide angle image 170 and the telephoto image 190 are synthesized.

Further, when the mobile device 100 captures an image with the zoom magnification ZM greater than or equal to the second reference magnification RZM2, the wide angle camera 110 may operate in one of the sensor standby mode, the low FPS post standby mode and the normal FPS post standby mode, and the telephoto camera 120 may operate in the active mode to provide the telephoto image 190.

In some example embodiments, as illustrated in FIG. 6, when the zoom magnification ZM is less than the first reference magnification RZM1, the telephoto camera 120 may operate in the sensor standby mode, thereby reducing power consumption. Further, when the zoom magnification ZM is greater than or equal to the second reference magnification RZM2, the wide angle camera 110 may operate in the normal FPS post standby mode, thereby reducing a mode transition time while reducing the power consumption.

FIG. 7 is a table for describing another example of operating modes of a wide angle camera and a telephoto camera in a mobile device including the wide angle camera and the telephoto camera according to example embodiments.

Referring to FIGS. 1 and 7, when the mobile device 100 captures an image with a zoom magnification ZM greater than or equal to the minimum magnification and less than a first reference magnification RZM1, the wide angle camera 110 may operate in the active mode, and the telephoto camera 120 may operate in a standby mode. In some example embodiments, as the zoom magnification ZM increases from the minimum magnification to the first reference magnification RZM1, an operating mode of the telephoto camera 120 is sequentially changed in an order from the sensor standby mode, to the low FPS post standby mode, to the normal FPS post standby mode. In an example illustrated in FIG. 7, the telephoto camera 120 may operate in the sensor standby mode when the zoom magnification ZM is greater than or equal to ×1.0 and less than ×1.5, may operate in the low FPS post standby mode when the zoom magnification ZM is greater than or equal to ×1.5 and less than ×2.0, and may operate in the normal FPS post standby mode when the zoom magnification ZM is greater than or equal to ×2.0 and less than ×2.5. Accordingly, the power consumption may be further reduced as the zoom magnification ZM decreases, and the mode transition time may be further reduced as the zoom magnification ZM increases close to the first reference magnification RZM1.

When the mobile device 100 captures an image with the zoom magnification ZM greater than or equal to the first reference magnification RZM1 and less than a second reference magnification RZM2, both of the wide angle camera 110 and the telephoto camera 120 may operate in the active mode.

Further, when the mobile device 100 captures an image with the zoom magnification ZM greater than or equal to the second reference magnification RZM2, the wide angle camera 110 may operate in a standby mode, and the telephoto camera 120 may operate in the active mode. In some example embodiments, as the zoom magnification ZM increases from the second reference magnification to a maximum magnification, an operating mode of the wide angle camera 110 is sequentially changed in an order from the normal FPS post standby mode, to the low FPS post standby mode, to the sensor standby mode. In an example illustrated in FIG. 7, the wide angle camera 110 may operate in the normal FPS post standby mode when the zoom magnification ZM is greater than or equal to ×4.5 and less than ×5.0, may operate in the low FPS post standby mode when the zoom magnification ZM is greater than or equal to ×5.0 and less than ×5.5, and may operate in the sensor standby mode when the zoom magnification ZM is greater than or equal to ×5.5. Accordingly, the power consumption may be further reduced as the zoom magnification ZM increases, and the mode transition time may be further reduced as the zoom magnification ZM decreases close to the second reference magnification RZM2.

Figure 8:
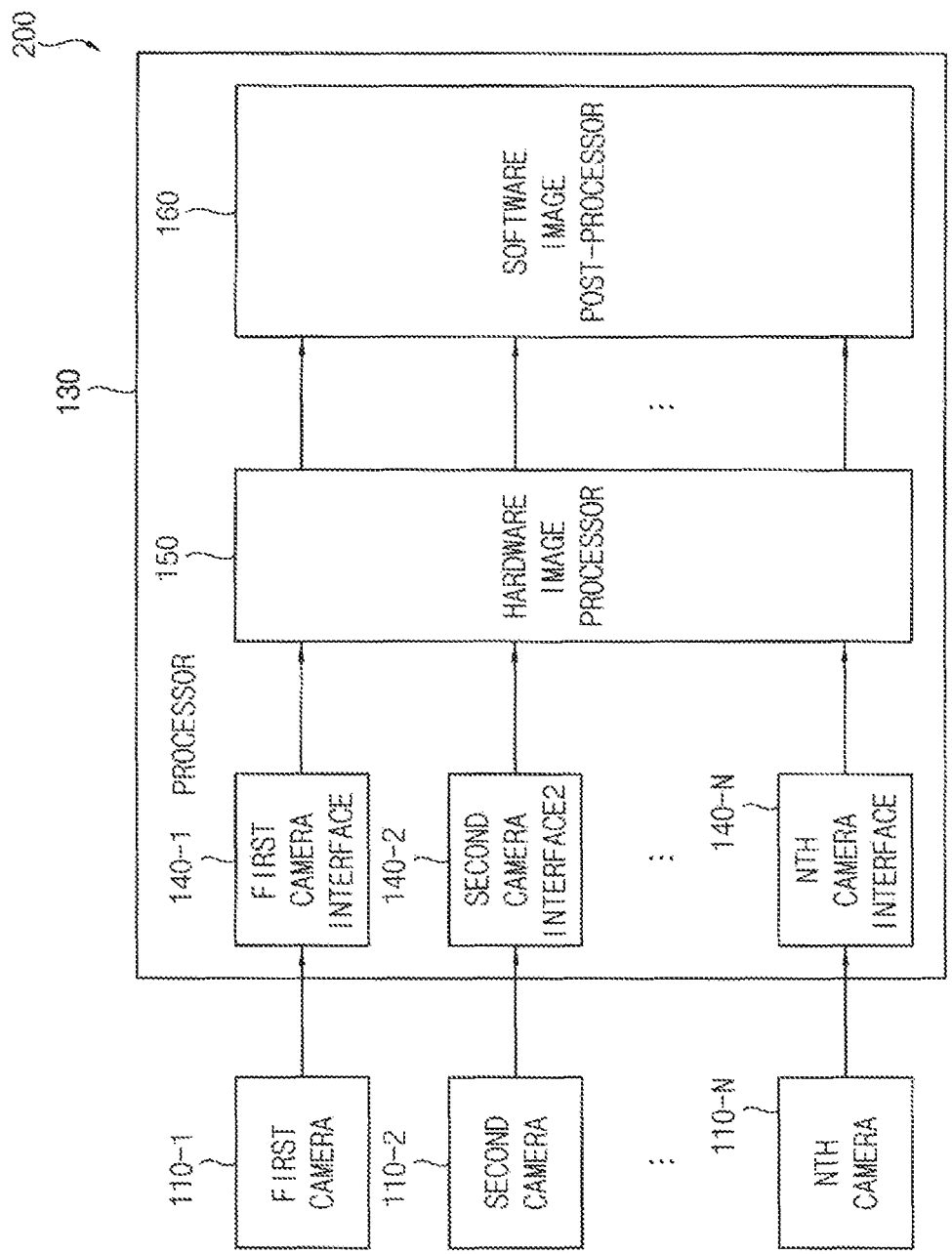
FIG. 8 is a block diagram illustrating a mobile device including multiple cameras according to example embodiments.

FIG. 8 is a block diagram illustrating a mobile device including multiple cameras according to example embodiments.

A mobile device 200 of FIG. 8 may have similar configurations and operations to a mobile device 100 of FIG. 2, except that the mobile device 200 includes N cameras 110-1, 110-2, . . . , 110-N and N camera interfaces 140-1, 140-2, . . . , 140-N respectively connected to the N cameras 110-1, 110-2, . . . , 110-N, where N is an integer greater than or equal to 3. At least one of the N cameras 110-1, 110-2, . . . , 110-N operating in an active mode may perform an image sensing operation (thus corresponding to the first camera 110 described in the above example embodiments), but at least one of the N cameras 110-1, 110-2, . . . , 110-N operating in a standby mode may not perform the image sensing operation (thus corresponding to the second camera 120 described in the above example embodiments). Further, the processor 130 may perform image processing on image data from the camera operating in the active mode, but may not perform the image processing on image data from the camera operating in the standby mode, as described with reference to the above example embodiments. Further, the mobile device 200 may support, as the standby mode, a sensor standby mode, a low FPS post standby mode and a normal FPS post standby mode, as described with reference to the above example embodiments. Accordingly, power consumption and/or mode transition time for the camera operating in the standby mode may be reduced.

The present inventive concept may be applied to any mobile device or any electronic device. For example, the present inventive concept may be applied to a smart phone, a tablet computer, a laptop computer, a cellular phone, an MP3 player, personal digital assistants (PDA), a portable multimedia player (PMP), a digital camera, a portable game console, etc.

The foregoing description is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A mobile device comprising:
  a plurality of cameras; and
  a processor configured to perform image processing on image data output from the plurality of cameras,
  wherein the mobile device supports, as a standby mode for at least one standby camera from which an image is not provided among the plurality of cameras, a sensor standby mode in which the at least one standby camera does not perform an image sensing operation that generates the image data, a low frames per second (FPS) post standby mode in which the at least one standby camera performs the image sensing operation that generates the image data with a low frame rate lower than a normal frame rate and the processor does not perform the image processing on the image data output from the at least one standby camera, and a normal FPS post standby mode in which the at least one standby camera performs the image sensing operation that generates the image data with the normal frame rate and the processor does not perform the image processing on the image data output from the at least one standby camera.

2. The mobile device of claim 1, wherein the at least one standby camera is not supplied with power in the sensor standby mode.

3. The mobile device of claim 1, wherein the at least one standby camera includes a volatile memory that stores configuration information, and
wherein, in the sensor standby mode, the volatile memory included in the at least one standby camera is supplied with power, and one or more components other than the volatile memory included in the at least one standby camera are not supplied with power.

4. The mobile device of claim 1, wherein, in the sensor standby mode, the at least one standby camera is supplied with power, and does not perform the image sensing operation.

5. The mobile device of claim 1, wherein the plurality of cameras include a wide angle camera and a telephoto camera.

6. The mobile device of claim 5, wherein, when the mobile device captures an image with a zoom magnification less than a first reference magnification, the wide angle camera operates in an active mode, and the telephoto camera operates in one of the sensor standby mode, the low FPS post standby mode and the normal FPS post standby mode,
wherein, when the mobile device captures the image with the zoom magnification greater than or equal to the first reference magnification and less than a second reference magnification, both of the wide angle camera and the telephoto camera operate in the active mode, and
wherein, when the mobile device captures the image with the zoom magnification greater than or equal to the second reference magnification, the wide angle camera operates in one of the sensor standby mode, the low FPS post standby mode and the normal FPS post standby mode, and the telephoto camera operates in the active mode.

7. The mobile device of claim 6, wherein, when the mobile device captures the image with the zoom magnification less than the first reference magnification, the telephoto camera operates in the sensor standby mode, and
wherein, when the mobile device captures the image with the zoom magnification greater than or equal to the second reference magnification, the wide angle camera operates in the normal FPS post standby mode.

8. The mobile device of claim 6, wherein, as the zoom magnification increases from a minimum magnification to the first reference magnification, an operating mode of the telephoto camera is sequentially changed in an order from the sensor standby mode, to the low FPS post standby mode, to the normal FPS post standby mode, and
wherein, as the zoom magnification increases from the second reference magnification to a maximum magnification, an operating mode of the wide angle camera is sequentially changed in an order from the normal FPS post standby mode, to the low FPS post standby mode, to the sensor standby mode.

9. The mobile device of claim 1, wherein the plurality of cameras include a mono camera and a color camera.

10. The mobile device of claim 1, wherein the processor performs the image processing on the image data output from one or more active cameras operating in an active mode among the plurality of cameras, and does not perform the image processing on the image data output from the at least one standby camera operating in the standby mode among the plurality of cameras.

11. The mobile device of claim 1, wherein the processor includes:
a plurality of camera interfaces, each configured to receive the image data from a respective one of the plurality of cameras;
a hardware image processor configured to perform the image processing on the image data received through the plurality of camera interfaces; and
a software image post-processor configured to perform image post-processing on the image data on which the image processing has been performed.

12. The mobile device of claim 11, wherein the hardware image processor includes:
a plurality of dedicated hardware image processors respectively corresponding to the plurality of cameras.

13. The mobile device of claim 12, wherein, when the at least one standby camera operates in the standby mode, one of the plurality of dedicated hardware image processors corresponding to the at least one standby camera is in an idle state.

14. A mobile device comprising:
a plurality of cameras including a first camera and a second camera; and
a processor configured to perform image processing,
wherein, when a first image from the first camera is to be provided, and a second image from the second camera is not to be provided,
the first camera operates in an active mode in which the first camera performs an image sensing operation that generates first image data and the processor performs the image processing on the first image data, and
the mobile device supports, as a standby mode for the second camera:
a sensor standby mode in which the second camera does not perform the image sensing operation that generates second image data,
a low frames per second (FPS) post standby mode in which the second camera performs the image sensing operation that generates the second image data that has a low frame rate lower than a normal frame rate and the processor does not perform the image processing on the second image data, and
a normal FPS post standby mode in which the second camera performs the image sensing operation that generates the second image data having the normal frame rate and the processor does not perform the image processing on the second image data.

15. The mobile device of claim 14, wherein the processor includes:
a first camera interface configured to receive the first image data from the first camera;
a second camera interface configured to receive the second image data from the second camera;
a hardware image processor configured to perform the image processing on the first image data and the second image data received through the first camera interface and the second camera interface, respectively; and
a software image post-processor configured to perform image post-processing on the first image data and the second image data on which the image processing have been performed.

16. The mobile device of claim 15, wherein the hardware image processor includes:
a first dedicated hardware image processor corresponding to the first camera; and
a second dedicated hardware image processor corresponding to the second camera;

wherein, when the first camera operates in the active mode, and the second camera operates in the standby mode, the first dedicated hardware image processor performs the image processing on the first image data, and the second dedicated hardware image processor is in an idle state.

17. A mobile device comprising:
a plurality of cameras including a wide angle camera and a telephoto camera; and
a processor configured to perform image processing on image data output from the plurality of cameras,
wherein, when the mobile device captures an image with a zoom magnification less than a first reference magnification, the wide angle camera operates in an active mode, and the telephoto camera operates in a standby mode,
wherein, when the mobile device captures the image with the zoom magnification greater than or equal to the first reference magnification and less than a second reference magnification, both of the wide angle camera and the telephoto camera operate in the active mode,
wherein, when the mobile device captures the image with the zoom magnification greater than or equal to the second reference magnification, the wide angle camera operates in the standby mode, and the telephoto camera operates in the active mode, and
wherein the standby mode for at least one standby camera of the plurality of cameras includes:
a sensor standby mode in which the at least one standby camera does not perform an image sensing operation that generates the image data,
a low frames per second (FPS) post standby mode in which the at least one standby camera performs the image sensing operation that generates the image data with a low frame rate lower than a normal frame rate and the processor does not perform the image processing on the image data output from the at least one standby camera, and
a normal FPS post standby mode in which the at least one standby camera performs the image sensing operation that generates the image data with the normal frame rate and the processor does not perform the image processing on the image data output from the at least one standby camera.

18. The mobile device of claim 17, wherein, when the mobile device captures the image with the zoom magnification less than the first reference magnification, the telephoto camera operates in the sensor standby mode, and
wherein, when the mobile device captures the image with the zoom magnification greater than or equal to the second reference magnification, the wide angle camera operates in the normal FPS post standby mode.

19. The mobile device of claim 17, wherein, as the zoom magnification increases from a minimum magnification to the first reference magnification, an operating mode of the telephoto camera is sequentially changed in an order from the sensor standby mode, to the low FPS post standby mode, to the normal FPS post standby mode, and
wherein, as the zoom magnification increases from the second reference magnification to a maximum magnification, an operating mode of the wide angle camera is sequentially changed in an order from the normal FPS post standby mode, to the low FPS post standby mode, to the sensor standby mode.

20. The mobile device of claim 17, wherein, when the zoom magnification is greater than or equal to a minimum magnification and less than a third reference magnification, the telephoto camera operates in the sensor standby mode,
wherein, when the zoom magnification is greater than or equal to the third reference magnification and less than a fourth reference magnification, the telephoto camera operates in the low FPS post standby mode,
wherein, when the zoom magnification is greater than or equal to the fourth reference magnification and less than the first reference magnification, the telephoto camera operates in the normal FPS post standby mode,
wherein, when the zoom magnification is greater than or equal to the second reference magnification and less than a fifth reference magnification, the wide angle camera operates in the normal FPS post standby mode,
wherein, when the zoom magnification is greater than or equal to the fifth reference magnification and less than a sixth reference magnification, the wide angle camera operates in the low FPS post standby mode, and
wherein, when the zoom magnification is greater than or equal to the sixth reference magnification, the wide angle camera operates in the sensor standby mode.

* * * * *